United States Patent [19]

Zitko

[11] Patent Number: 5,200,055
[45] Date of Patent: Apr. 6, 1993

[54] SYSTEM AND METHOD FOR CHROME RECOVERY

[76] Inventor: Larry J. Zitko, 6980 Rt. 534, Windsor, Ohio 44099

[21] Appl. No.: 752,038

[22] Filed: Aug. 29, 1991

[51] Int. Cl.[5] .................... C25D 21/04; C25D 21/06; B01D 45/00
[52] U.S. Cl. ........................ 205/94; 204/276; 204/278; 204/DIG. 13; 55/72; 55/259
[58] Field of Search ............ 204/149, 277, 278, 237, 204/279, DIG. 13, 276; 205/94, 98–99, 283; 55/259, 72

[56] References Cited

U.S. PATENT DOCUMENTS

| | | | |
|---|---|---|---|
| 1,117,309 | 11/1949 | Bentz . | |
| 2,439,491 | 4/1950 | Schiffl | 204/277 |
| 2,688,376 | 9/1954 | Gilliam | 183/10 |
| 3,266,288 | 8/1966 | Plizak et al. | 55/426 |
| 3,785,127 | 1/1974 | Mare | 55/233 |
| 4,022,596 | 5/1977 | Pedersen | 55/528 |
| 4,171,255 | 10/1979 | Tuznik et al. | 204/278 X |
| 4,297,116 | 10/1981 | Cusick | 55/319 |
| 4,425,197 | 1/1984 | Inoue | 204/278 X |
| 4,579,569 | 4/1986 | Sheng et al. | 55/259 X |
| 4,592,819 | 6/1986 | Suzuki et al. | 204/DIG. 13 X |
| 5,104,496 | 4/1992 | Dupree | 204/278 X |
| 5,110,325 | 5/1992 | Lerner | 55/259 X |
| 5,112,465 | 5/1992 | Danielson | 204/279 X |

OTHER PUBLICATIONS

Chromium Electroplaters Test Report published by the EPA, dated Feb. 1989.

*Primary Examiner*—Donald R. Valentine
*Attorney, Agent, or Firm*—Watts, Hoffmann, Fisher & Heinke

[57] ABSTRACT

A chrome plating facility having a chrome recovery system into which chrome bearing mist, swept from a chrome plating solution surface, is directed. The system comprises a chrome removal system and a chrome reclamation system. The removal system comprises structure defining surfaces for collecting chrome from the vapor flowing through the station, a second chrome removal station downstream from the first removal station and comprising second structure defining surfaces for collecting chrome from fluid flowing through the second station. The reclamation system recovers chrome from the removal system and comprises a solvent reservoir, solvent recirculating means for directing reservoir solvent onto the second chrome removal station surfaces for removing chrome therefrom and returning the solvent and chrome to the reservoir. Periodically the reservoir solvent is directed onto the first chrome removal station surfaces for removing the chrome therefrom and the solvent and chrome from the first removal station is returned to the plating solution.

10 Claims, 3 Drawing Sheets

SYSTEM AND METHOD FOR CHROME RECOVERY

FIELD OF THE INVENTION

The present invention relates to chrome recovery and more particularly relates to a method and system for recovering and recycling chrome from mist-like fluid released by chrome plating equipment.

BACKGROUND OF THE INVENTION

Chrome plating solutions are formed by chrome oxides dissolved in water to form chromic acid. These solutions are maintained at temperatures substantially above normal room temperature (e.g. 135° F.) and are continuously agitated during the plating process. As a consequence a substantial amount of liquid and vapor escapes from the tank. A dense mist forms in the atmosphere just above the plating solution surface. The mist contains a considerable amount of hexavalent chrome which must be segregated from the ambient atmosphere.

In the past the chrome bearing mist was swept from the plating solution surface by exhaust systems. The typical exhaust system was formed by a hood located adjacent the plating solution surface, a duct system leading from the building and an induction fan for drawing the mist into the hood and duct and exhausting the mist to atmosphere.

The amount of chrome introduced into the environment by such exhaust systems was excessive and considered a health hazard. Accordingly proposals were made for removing chrome from the mist. In some proposals the exhaust fans directed the mist through filters which removed chrome before it could be exhausted to atmosphere. In other proposals the mist was directed through scrubbers which removed the chrome. The chrome removed by these devices was sometimes collected and disposed of as a toxic waste material or was processed further to reclaim it for eventual reuse.

Chrome compounds are expensive materials. Reclamation was thus an attractive alternative to disposal as toxic waste or even exhausting chrome bearing mist to atmosphere. Reclamation required capital expenditures and incurred operating costs which reduced its attractiveness. Furthermore the prior art schemes failed to eliminate a small, but environmentally significant, percentage of the total chrome in the plating tank mist. This chrome was exhausted into the atmosphere.

The present invention provides a new and improved method and apparatus for removing chrome from plating solution mists wherein virtually all the chrome is removed from the effluent chrome plating solution mist before it is exhausted to atmosphere, the chrome is reclaimed for immediate reuse in the plating solution and the capital and operating expenses required for reclamation are not significant.

DISCLOSURE OF THE INVENTION

The present invention provides a new and improved method for recovering chrome from chrome bearing mist-like fluid generated from a chrome plating process. The preferred method comprises inducing a flow of chrome bearing fluid from adjacent the surface of a chrome plating solution along a flow path through first and second chrome removal stations, stationing the first chrome removal station in the flow path with chrome collecting surfaces oriented for contact with the chrome bearing fluid and depositing chrome thereon, stationing the second chrome removal station in the flow path with second chrome collecting surfaces oriented for collecting chrome from fluid flowing therethrough and depositing chrome thereon, and, reclaiming chrome from the first and second chrome removal stations by directing solvent onto the second station surfaces to remove chrome deposited thereon, thereafter directing the solvent and second station chrome onto the first station surfaces to remove chrome deposited thereon, and collecting the solvent and first and second station chrome.

In a chrome recovery system constructed according to the invention chrome bearing fluid is swept from a chrome plating solution surface into the recovery system. The preferred system comprises a chrome removal station having structure defining surfaces for collecting chrome from the fluid flowing through the station, a second chrome removal station downstream from the first removal station and having second structure defining surfaces for collecting chrome from fluid flowing through the second station, and a chrome reclamation system for reclaiming chrome collected by the surfaces comprising a solvent reservoir, solvent recirculating means for directing reservoir solvent onto the second chrome removal station surfaces for removing chrome therefrom and returning the solvent and chrome to the reservoir, and chrome collecting means for directing solvent and chrome from the reservoir onto the first chrome removal station surfaces for removing the chrome therefrom for reclamation with the solvent.

Further features and advantages of the invention will become apparent from the following detailed description of a preferred embodiment made with reference to the accompanying drawings which form a part of the specification.

DESCRIPTION OF THE BEST MODE FOR PRACTICING THE INVENTION.

Figure 1:
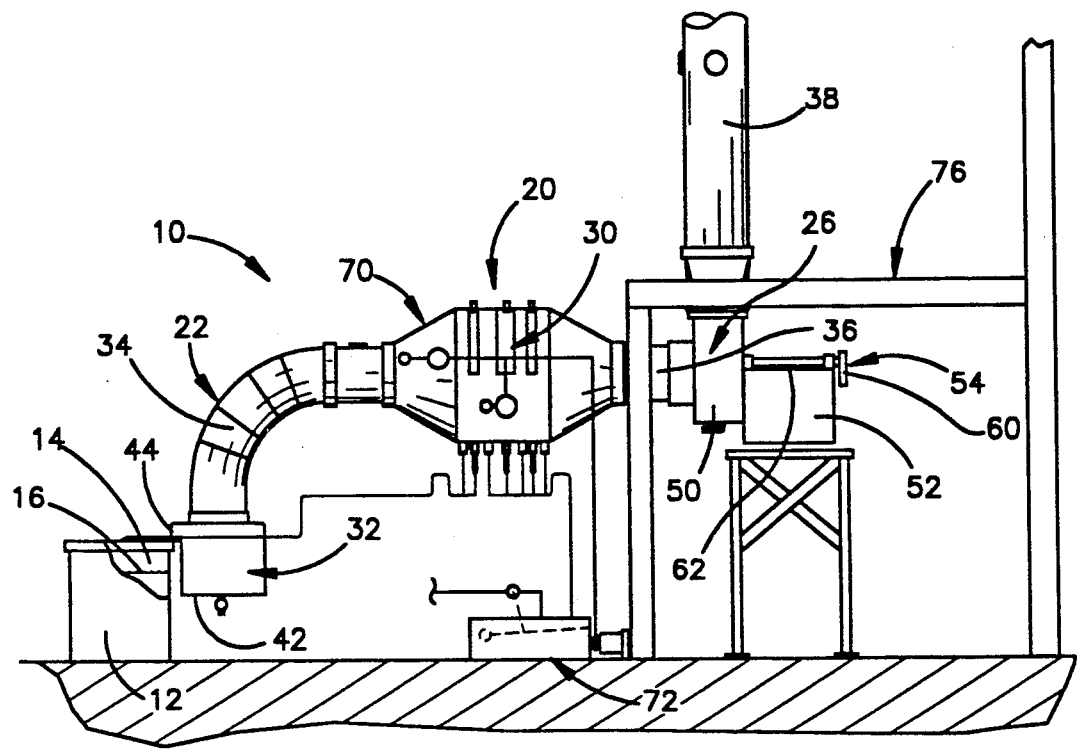
FIG. 1 is a schematic elevational view of a chrome recovery system constructed according to the invention associated with a chrome plating facility only a part of which is illustrated schematically.

Part of a chrome plating facility 10 is illustrated by FIG. 1 of the drawings as comprising a plating tank 12 containing a chrome plating solution. Parts in the tank are be electroplated with chrome from the solution. Electroplating equipment used with the tank is conventional and therefore not illustrated or described further. The facility 10 is of a type used to plate work pieces where they are being fabricated (i.e. in factory buildings) or in separate plating shops. The facility 10 comprises a series of related tanks (not illustrated) in which the parts are immersed during the plating process.

The plating equipment maintains the chrome plating solution at temperatures between 110 and 150 degrees Fahrenheit and strongly agitates the solution while electroplating is taking place. As a consequence of the relatively high plating solution temperature and its vigorous agitation the region 14 between the top lip of the tank and the solution surface 16 tends to fill with a dense mist formed in part by plating solution droplets. These droplets contain hexavalent chrome, a toxic substance which can not be permitted to enter the plating shop atmosphere or to be condensed on walls, floors and equipment in the shop.

The tank 12 is equipped with a chrome recovery system 20 constructed according to the invention which sweeps the chrome bearing mist from the region 14, removes essentially all the chrome from the mist, reclaims the chrome for reuse, and exhausts the remaining air and chrome free water vapor to the atmosphere outside the plating facility. The preferred chrome recovery system 20 comprises a duct system 22 for exhausting effluent from the region 14 to atmosphere, a blower 26 for inducing exhaust flow in the duct system arrangement, and a chrome removal and reclamation unit 30 through which the fluid flowing in the duct passes before being exhausted to atmosphere.

The duct system 22 is constructed and arranged to sweep the plating solution surface completely free of the chrome bearing mist, direct the mist to the unit 30 and then direct the fluid flowing from the unit 30 out of the building in which the plating facility is located. The system 22 comprises a conventional hood 32, a mist duct 34 leading from the hood 32 to the unit 30, an exhaust duct 36 leading from the unit 30 to the blower 26 and an exhaust stack 38 for directing exhaust fluid out of the building.

The hood 32 comprises a mist receiving chamber structure 42 defining an elongated induction slot 44 extending completely along one side of the plating tank lip. The blower 26 reduces the hood chamber pressure level significantly below atmospheric pressure thus inducing a substantial flow of atmosphere adjacent the slot 44 into the hood chamber 42. The mist generated by the plating solution tends to hover over the solution surface 16 adjacent the slot 44 and thus the hood effectively sweeps the mist from the surface. Any droplets from the chrome mist which impact, or condense, on the hood chamber walls gravitate to the lower reaches of the hood where they are collected for return to the plating tank.

The mist and atmospheric air exiting the hood flow to the unit 30 through the duct 34. The duct 34 is hermetically joined to the upper side of the hood and extends upwardly and laterally to the unit 30. The duct can be fashioned from any suitable material. In the illustrated embodiment the duct 34 is formed by sections of plastic (PVC) pipe cut to length and hermetically bonded to each other to form vertical and horizontal runs joined by a gradual 90 degree bend between the hood and the unit 30. The duct end remote from the hood is hermetically joined to the unit 30. Mist droplets condensing on the wall of the duct 34 tend to gravitate back into the hood for collection and return to the plating solution.

The exhaust duct 36 and the stack 38 direct effluent from the unit 30 out of the building via the blower 26. The duct 36 and stack 38 may be formed from PVC or similar plastic or from sheet metal materials because the effluent from the unit 30 is relatively free from water droplets and corrosive elements. The duct 36 is hermetically joined to the unit 30 and to the blower 26 while the stack 38 is hermetically connected to the blower and extends upwardly to a location outside the building where it is open to the atmosphere.

The blower 26 is formed by a centrifugal fan unit 50, an electric drive motor 52 and a power transmission 54 coupling the fan unit to the motor. The fan unit 50 comprises a centrifugal squirrel cage fan mounted for rotation in a housing. The duct 36 is joined to the fan housing in alignment with the fan rotation axis. Effluent from the unit 30 enters the fan throat from the duct 36 and exits the housing 58 from the fan periphery upwardly through the stack 38. The motor 52 is preferably a conventional a.c. induction motor having its output shaft connected to the fan via the transmission 54. The illustrated transmission comprises a drive belt 60 and a fan drive shaft 62. The belt 60 is reeved around a sheave on the motor shaft and a sheave on the fan drive shaft 62. The fan drive shaft is supported by suitable pillow blocks and bearing assemblies (not shown) attached to the fan housing.

The chrome removal and reclamation unit 30 comprises a chrome removal system 70 for removing chrome from the mist induced into the duct system and a reclamation system 72 for collecting the chrome from the system 70 for reuse. The illustrated reclamation unit 30 is elevated above the level of the plating tank and supported by a suitable structural framework 76. The unit 30 is accessible by maintenance personnel for performing their tasks.

Figure 2:
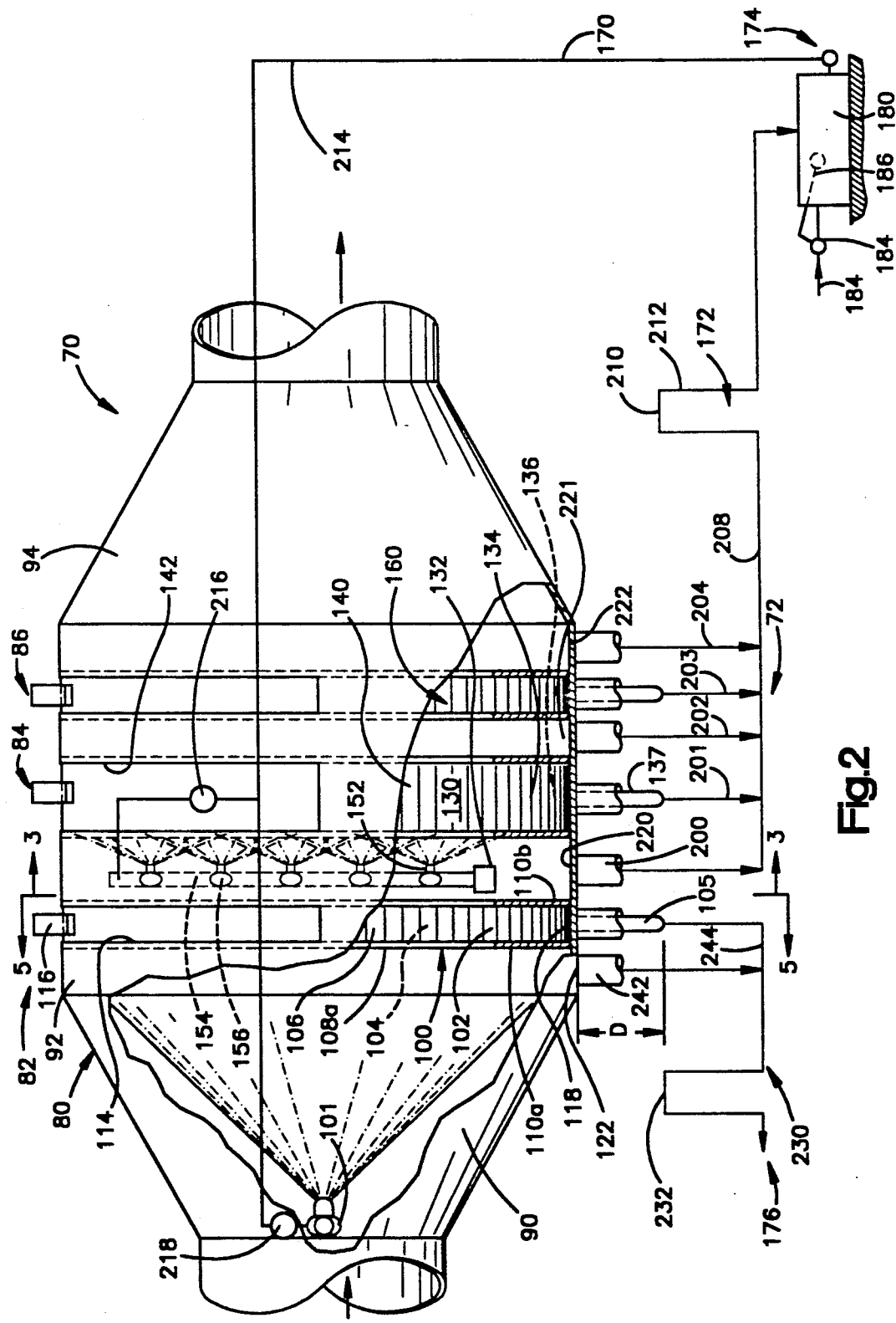
FIG. 2 is an enlarged view of the chrome recovery system of FIG. 1 having parts shown schematically and portions broken away and illustrated in cross section.

Referring to FIG. 2, the removal system 70 comprises a housing 80 supporting a series of chrome removal stations 82, 84, 86 through which the fluid flowing in the duct system is directed. The housing 80 comprises a frustoconical flow diffuser inlet section 90, a cylindrical central body 92 and a frustoconical, convergent exit section 94. The inlet section 90 is attached to the duct 42 for introducing the chrome bearing mist into the body 92 at reduced velocity for passage through the stations 82, 84, 86. The body 92 has a substantially larger diameter than the duct 42 and supports the chrome removal stations at spaced locations along the flow path through the housing where they can be accessed for maintenance and replacement. The housing 80 is constructed from a plastic resin material (PVC) which is nonreactive with chrome compounds the same as the duct 42 so that the hexavalent chrome and related compounds do not degrade the housing.

The chrome removal stations 82, 84, 86 are disposed in series in the housing 80 to perform successive, distinct chrome removal operations. The station 82 collects a large proportion of the chrome in the mist flowing through it with a much of that chrome deposited in the station in a more or less solid form. The second station 84 is constructed and arranged to collect chrome from finely divided effluent droplets from the first station by entraining the effluent in a solvent spray and collecting it. The third station collects effluent droplets from the second station which contain very little chrome. Essentially all chrome in the mist induced into the hood is removed by the stations 82, 84, 86.

The first station 82 comprises a chrome collector assembly 100 and a wash down spray assembly 101. The assembly 100 defines a large area contact surface for contacting the mist flowing through the station and collecting chrome deposited on the surface. The mist flowing into the first station 82 is comprised of the complete range of chrome bearing mist droplet sizes, particularly relatively large droplets containing considerable amounts of chrome. The mist droplets are entrained in a turbulent stream moving through the station 82. Virtually all of the large droplets are deposited on the first station contact surface together with the vast majority of the smaller sized chrome bearing droplets or vapor components. The chrome bearing solution collected by the chrome removal assembly tends to gravitate downwardly along the contact surface for removal from the housing.

Liquid on the contact surface evaporates creating semi-solid chrome deposits which are periodically removed by the wash down spray assembly. After the system 20 is operated for a time (e.g. from 6–24 hours depending on the parts being plated) the contact surface develops deposits of a sludge-like chrome bearing compound. This material is viscous and gravitates slowly, if at all, to the lower regions of the housing surface. It must eventually be "washed down" off of the contact surface. Washing down is accomplished by spraying liquid solvent, or scrubbing liquor, onto the contact surface from the spray assembly 101 disposed upstream from the station in the flow diffuser section 90. The scrubbing liquor may be water from the same source as the water used in the plating tanks; but is preferably a water based chrome solution obtained from the collecting stations 84, 86 as described presently.

Figure 5:
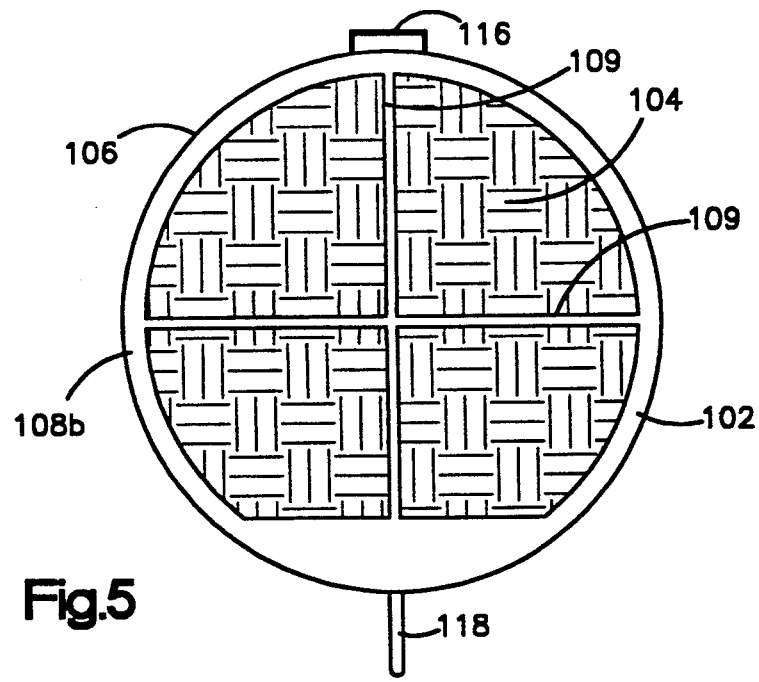

The collector assembly 100 in the illustrated and preferred embodiment is a so called "dry mesh pad" assembly (because the spray assembly is operated only periodically for cleaning purposes) which comprises an annular support body 102, a plastic mesh pad 104 contained in the body 102 (see FIGS. 2 and 5) and a drain tube structure 105. The body 102 supports the mesh pad 104 in the flow path of the mist and the chrome is collected on the mesh pad. The chrome material gravitating from or being washed down off of the mesh pad 104 collecting surface passes from the body 102 via the drain tube structure 105.

The body 102 comprises an annular plastic member having a cylindrical outer wall 106, inwardly extending flanges 108a, 108b at respective opposite ends of the wall 106, and mesh pad support spokes 109 each extending between spaced apart locations on a respective flange 108b to maintain the mesh pad flat and in position within the body 102. The flanges and outer wall form a channel shaped mesh pad retaining body periphery into which the chrome material collected on the mesh pad gravitates. The spokes 109 support the central mesh pad area along the downstream side of the body 102. The fluid flow through the mesh pad 104 maintains the mesh pad in engagement with the spokes and the spokes prevent the mesh pad from being dislodged from the body. The wall 106, flanges 108 and spokes 109 are all formed from PVC plastic sheet material and welded or glued together.

The assembly 100 is seated within the housing 80 with its outer periphery fitted snugly in the body so that all the flow in the body 92 passes through the mesh pad 104. The cylindrical wall 106 has an outer diameter which is the same as the inner diameter of the housing body 92. The interior of the housing body carries inwardly extending mounting flanges 110a, 110b which receive the flanges 108a, 108b between them. The flange 108b carries an annular gasket, or sealing ring, 112 which is compressed between the flanges 108b, 110b along the inner wall of the body 92 when the system operates (the flanges are pressed toward each other by differential pressure across the pad 104). The gasket prevents chromic acid mist flow around the outer periphery of the mesh pad 104 via the interface between the flanges 108, 110. The flanges 110 are identical in construction to the flanges 108 and are welded to the interior wall of the body 92.

The support body 102 is removably received by the body 92 via a loading slot 114 extending through about 180 degrees around the upper side of the housing body 92. The loading slot width corresponds to the axial length of the body wall 106 so that leakage around the mesh pad assembly via the slot 114 is relatively slight. The interior of the housing body is at subatmospheric pressure so that any leakage occurs into the duct system from the ambient atmosphere. A handle 116 on the upper side of the housing body facilitates housing removal for maintenance or replacement.

The drain tube structure 105 comprises an elongated tube bonded in an opening in the bottom of the body 102 and projecting from the outer wall 106. The tube structure 105 extends loosely through a drain port 118 in the bottom of the housing body 92. Chrome material which has gravitated through the mesh pad to the bottom of the support body 102 flows through the tube 105 to the reclamation system 72.

The mesh pad 104 is seated within the channel shaped annulus between the flanges 108. The mesh pad 104 is a dense, thick circular pad structure formed by a dozen or so circles of cloth formed by woven polypropylene monofilament fibers and sewn together with their peripheries in alignment. The polypropylene cloth circles are stitched together in groups three or four so that stitching threads do not provide any mist pathway completely through the pad. The interstices of the cloth fibers thus provide tortuous flow paths through the pad 104 insuring that the chrome bearing mist droplets contact the fibers. The plastic fibers thus form the chrome collecting surface which is quite large.

Various polypropylene cloth weave densities and fiber diameters can be used in fabricating the mesh pad. A pad construction which has been found effective is formed from eight or nine circles of a "coarse" weave cloth at the upstream side of the pad and three circles of "fine" weave cloth on the downstream side. The coarse weave cloth is formed from 0.018 inch diameter filament in a honeycomb weave having a density of 11 oz. per square foot. The fine weave cloth is formed from 0.011 diameter filaments in a honeycomb weave having a density of 8.5 oz. per square foot.

The mist passing through the housing 80 contacts the inner walls of the inlet section 90 and the inner body wall upstream from the station 82 where some mist liquid and chrome are deposited. These deposits gravitate to the lowermost elevation of the body 92 and pass from the body through a housing drain port 122, upstream from the flange 110a and axially adjacent the port 118, to the reclamation system 72.

Figure 3:
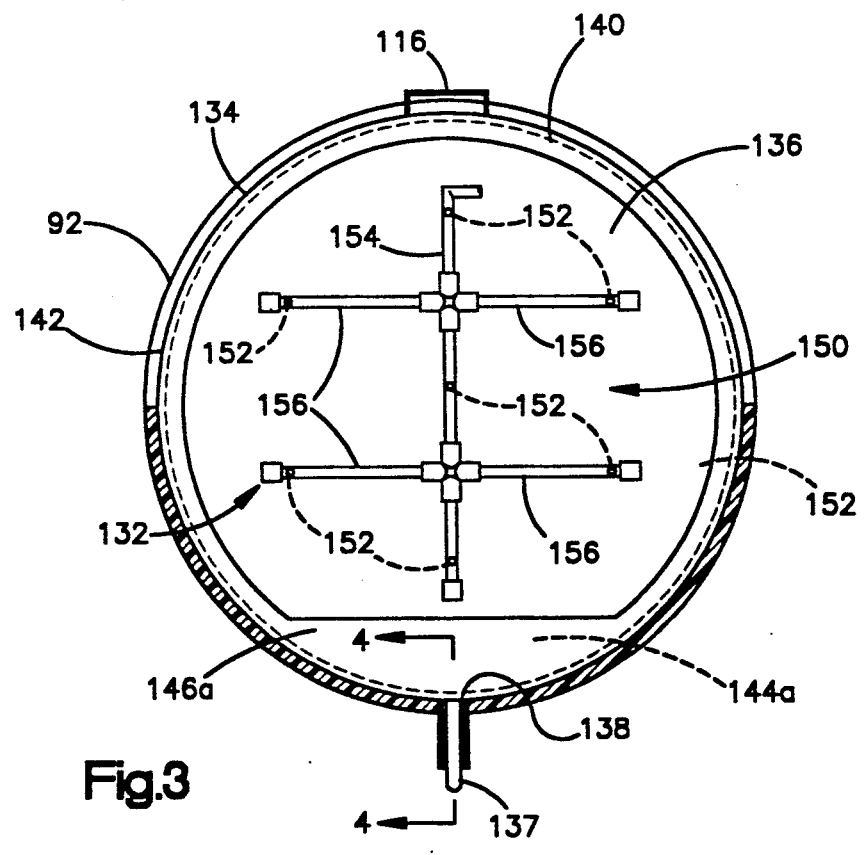
FIG. 3 is a cross sectional view seen approximately from the plane indicated by the line 3—3 of FIG. 2.
Figure 4:
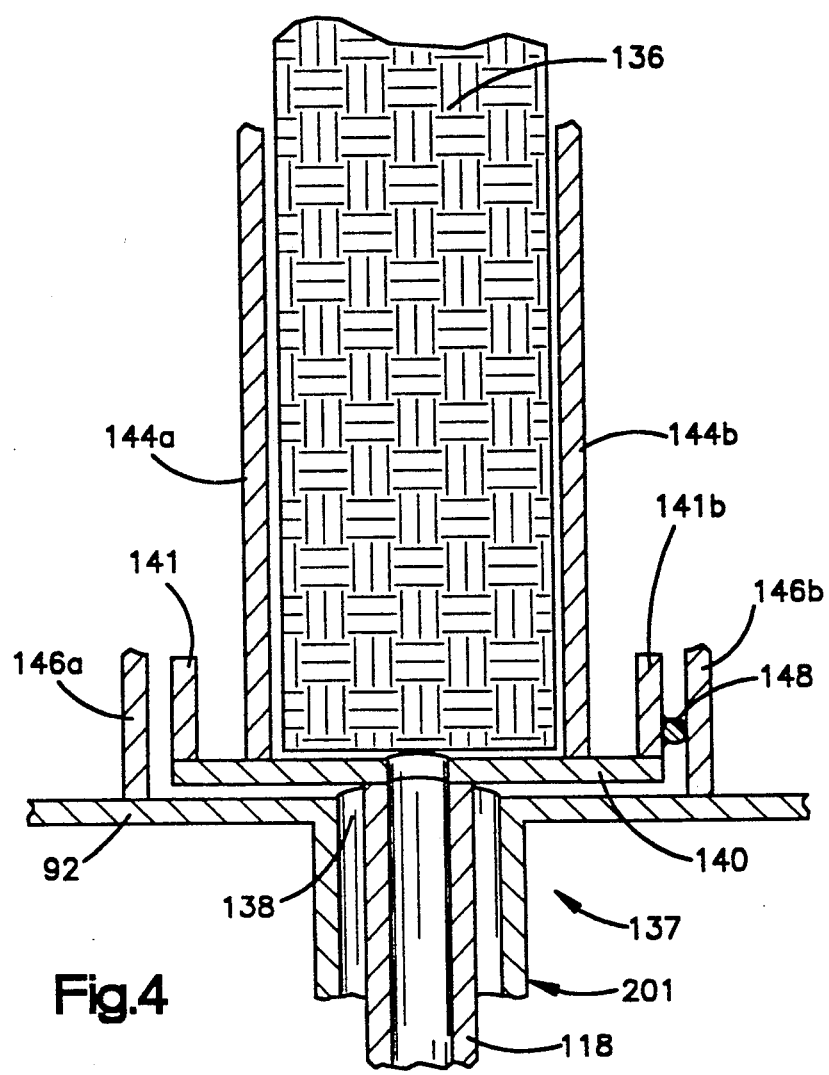
FIG. 4 is an enlarged fragmentary cross sectional view seen approximately from the plane indicated by the line 4—4 of FIG. 3; and, FIG. 5 is a fragmentary elevational view seen approximately from the plane indicated by the line 5—5 of FIG. 2.

The station 82 efficiently and effectively removes nearly all the chrome from the mist. Nevertheless some chrome passes through this station because the chrome is carried in mist droplets having diameters so small they pass through the mesh pad 104 without adhering to, or "condensing" on, any of the fibers. The second station 84 is constructed and arranged to collect most of the effluent chrome from the first station for reclamation. The second station construction is thus specialized for collecting fine droplets of the chrome bearing mist and comprises a chrome collector assembly 130 and a solvent spraying assembly 132 coacting to provide a "wet mesh pad" chrome removal station. The station 84 is illustrated by FIGS. 2-4.

The chrome collector assembly 130 in the illustrated and preferred embodiment comprises an annular support body 134, a plastic mesh pad 136 contained in the body 134 and a drain tube structure 137. The body 134 supports the mesh pad 136 in the flow path of the effluent from the first station 82 so that chrome is collected on the mesh pad. The chrome and solvent collected on the mesh pad 136 remain in the liquid state and gravitate through the mesh pad to the lower part of the body 134 where the liquid passes from the body via the drain tube structure 137 which projects through a body port 138.

The body 134 is constructed like the body 102 except that the axial length of the cylindrical outer wall 140 (FIG. 4) is greater than that of the wall 106 and the ends of the wall 140 are provided with end flanges 141. The loading slot 142 is thus axially longer than the slot 106 and the wall 140 is snugly received in the slot 142. The increased lengths of the wall 140 and slot 142 permit manual access to the interior of the housing 80 for cleaning purposes. It is frequently necessary to be able to reach inside the housing with a hose or other clean-out tool. The body 134 is provided with mesh pad retaining flanges 144a, 144b just like the flanges 108a, 108b of the body 102. The flanges 144a, 144b are spaced the same axial distance apart and equidistant from the axial center of the wall 140. Accordingly the wall 140 overhangs the flanges 144. The end flanges 141 are narrow annular PVC elements which extend about the inner periphery of each axially projecting end of the wall 140 and are glued or welded in place. The housing flanges 146 (constructed like the flanges 110) associated with the body 134 extend closely adjacent the opposite ends of the wall 140 and confront the end flanges 141. A sealing gasket 148 (like the gasket 112) is carried by the end flange 141b and is compressed between the end flange 141b and the flange 146b when the system 20 is operating. The gasket compression is caused by differential pressure across the collector assembly 130. The differential pressure force ensures that mist does not leak around and past the collector 130. The remaining constructional details of the body 134 and the drain tube are like those described above in connection with the body 102 and drain tube structure 105. Reference should be made to those descriptions for a further understanding of the body 134 and drain tube 137.

The mesh pad 136 (FIG. 4) is seated within the channel shaped annulus defined by the support body 134. The mesh pad 136 comprises a dense pad of circular polypropylene fabric layers carried by the body 134 and constructed like the pad 104. The pads 136 and 104 have the same axial and diametral dimensions. The fabric circles are stitched together in the manner described above in reference to the pad 104.

The solvent spraying assembly 132 produces a plurality of finely divided solvent sprays directed toward the body 134 and mesh pad 136 from their upstream side to facilitate depositing chrome on the pad 136. The solvent sprays entrain the effluent from the station 82 creating relatively larger sized particles which are consequently deposited in the pad. The solvent spraying assembly is supplied with high pressure solvent constantly during operation of the system 20 so the mesh pad 136 is constantly wetted during use. The collector 130 is therefore referred to as a "wet mesh pad" unit. The solvent in the illustrated embodiment is water from the same supply used to provide water for the chromic acid in the plating tanks.

The assembly 132 comprises a manifold 150 (see FIG. 3) supporting an array of spray nozzles 152 which are positioned to produce solvent sprays which overlap each other at the face of the mesh pad and thus fully cover the mesh pad face with sprayed solvent. The manifold 150 has a central PVC distributor line 154 formed by individual pipes and four outwardly projecting PVC nozzle feeder pipes 156 communicating with the distributor pipes and capped at their projecting ends. In the illustrated embodiment there are seven spray nozzles. Six nozzles are arranged in a generally circular array symmetrically around the centerline of the body 92, with four supported on respective feeder pipes 156 and the other two supported at spaced locations on the distributor line 154. The seventh nozzle is disposed centrally of the circular nozzle array on the distributor line 154. Solvent sprayed onto the assembly 132 collects in the mesh pad together with entrained chrome bearing fluid from the first station 82. The liquid drains from the pad into the support body and from the support body via the tube 118.

Little, if any, overspray from the station 84 occurs but virtually all the effluent from the station 84 is collected in a dry mesh pad collector assembly 160 at the station 86. The assembly 160 is constructed identically to the collector assembly 100 in the chrome removal station 84. Identical parts are identified in the drawings by corresponding reference characters. Further description of the collector assembly 160 is omitted for purposes of brevity. Suffice it to say that the collector 160 is not associated with a solvent (or scrubbing liquor) spray assembly because the chrome content in the fluids collected by the assembly 160 is extremely small and does not tend to build up sludge-like deposits on the mesh pad over time.

The liquid collected from the stations 84, 86 is delivered to the reclamation system 72 for recirculation and eventual reuse in the plating operation. In the illustrated embodiment of the invention the reclamation system 72 comprises a reservoir 170 for chrome solution collected by the stations 84, 86, a drain network 172 for directing solution to the reservoir from the stations, a pump 174 for pumping the liquid from the reservoir to the chrome removal system 70, and a conduit system 176 for receiving chrome solution collected by the system 70.

The reservoir 170 includes a tank 180, a solvent supply in the form of a make-up water supply line 182, a control valve 184 governing the flow of make-up water into the tank and a float mechanism 186 for actuating the valve in response to detected tank liquid levels. The tank 180 is illustrated as a rectangular box-like structure formed by welded plates having a loosely fitting cover which prevents foreign matter from entering the tank while assuring that the tank is maintained at atmospheric pressure. The valve 184 and float mechanism 186 are of conventional commercially available construction and are therefore not illustrated or described in detail. Suffice it to say that whenever the liquid level in the tank drops below a predetermined elevation the float mechanism 186 actuates the valve 184 to replenish the quantity of liquid in the tank. When the tank liquid level reaches a predetermined higher elevation the float mechanism closes the valve 184.

The drain network 172 communicates the stations 84, 86 to the reservoir so that liquid collected at the stations is passed to the tank 180. The drain network 172 comprises body drain lines 200–204 communicating with respective locations in the body 92, a manifold line 208 into which the body drain lines empty, a trap 210 and a delivery line 212 directing liquid from the trap 210 to the tank.

The drain lines 200–204 are formed by plastic (PVC) pipes hermetically joined to the body 92 at its lowermost elevation and extend downwardly a substantial distance to the manifold line 208. The manifold line is formed by a plastic (PVC) pipe, extends horizontally beneath the body 92, and is hermetically joined to each respective drain line. The drain lines 201, 203 are secured to the body 92 about the collecting station drain ports 118, 138. The ports and lines are of larger diameter than the drain tube structures 137 extending within them so that liquid from the body outside the collector assemblies 132, 160 can drain from the body via the respective body ports.

The drain lines 200, 202, and 204 communicate with the interior of the body 92 via body ports 220–222. The ports 220–222 and drain lines 200, 202 and 204 enable drainage of the body interior between the stations 82, 84 and 86 as well as draining the converging exit body section 94 downstream from the station 86. The reason why these lines are required is that the housing flanges associated with the respective stations effectively dam up any liquid collecting in the body between the stations. This is particularly true when the body is periodically cleaned out by hosing down the interior. During normal operation of the system 20 the drain lines 200, 202, and 204 carry only minimal amounts of liquid away from the body.

In the preferred embodiment of the invention the drain lines 200–204 are fabricated in two separate steps. First the ports are formed in the body 92, PVC coupling members are shaped to conform to the body contour and hermetically welded in place to the body about the ports. When the system 20 is installed in the field, PVC pipes are glued in place in the coupling and glued to the manifold pipe to complete the construction.

The trap 210 is associated with the manifold line so that the interior of the housing 80 may be maintained at a vacuum pressure and not communicated to atmospheric air via the drain lines. Accordingly, the housing 80 is elevated (in the illustrated embodiment above the plating solution surface 16) substantially above the manifold line and the trap 210 is constructed with its highest level below the lowest elevation in the housing 80. During operation of the system 20 liquid remains in the manifold line 208 and the drain lines thus blocking entry of atmospheric air into the housing. Elevation of the housing 80 permits using a simple trap, avoiding use of complicated valves and valve arrangements which might otherwise be required.

When the system 20 operates, atmospheric pressure force, acting through the tank 180 and the delivery line 212, is opposed by the vacuum pressure force in the housing 80 and the differential liquid column established in the leg of the trap 210. The result is that a column of the chrome solution exists in the drain lines 200–204 extending close to the elevation of the bottom of the housing 80.

The flow in the body 92 is such that liquid draining from the support bodies tends to be swept back into the body unless it is well isolated from the fluid flow effects. For this reason the drain tube structures 137 are dimensioned to extend well below the bottom of the body 92 in their respective drain lines (by a distance D illustrated in FIG. 2). Consequently liquid drained from the stations 82, 84 enters the drain network remote from the body 92 below the housing 80 (preferably a distance not less than about 6 inches) and does not tend to be swept back into the body by fluid flow effects.

As liquid drains from the body 92 into the drain lines 200–204 the liquid column in the line increases in height so the atmospheric pressure force is unbalanced and some liquid flows through the trap 210 and the delivery line 212 to the tank 210. This process is repeated constantly as the system 20 operates and chrome is removed from the mist induced into the system.

The pump 174 is preferably an electric motor driven centrifugal pump unit mounted on one side of the tank 180 with its inlet communicating with the solution in the tank and its discharge communicable with the spraying assembly 132 and the wash down spray assembly 101. The pump is controlled so that when the system 20 operates the pump also operates. In the illustrated embodiment the pump discharge is hermetically connected to a discharge pipe 214 extending from the pump upwardly and along the body 92 to branch lines extending to the respective spray assemblies. Manually operated valves 216, 218 are disposed in respective branch lines. The valve 218 is normally closed. The valve 216 is normally open and with the pump operating the reservoir solution is pumped into the spraying assembly 132. The pumped liquid is collected by the collector assemblies 130, 160 and returned to the tank 210.

As the system 20 operates under normal conditions the solution in the reservoir is recirculated. The effect of continued collection of chrome from the stations 84, 86 and continued recirculation of the solution is that the chrome concentrations in the reservoir solution increase over time. This is true even though evaporation of some of the solution occurs and fresh make-up water is introduced into the reservoir.

Built-up chrome deposits must periodically be removed from the mesh pad in the collection station 82. This is required between one and four times per operating day depending on the parts being plated. According to the present invention the scrubbing procedure is accomplished using the reclamation system reservoir solution with the resultant chrome laden scrubbing liquor being returned to the plating tank 12 for reuse via the conduit system 176. This end is achieved by pumping the relatively concentrated reservoir solution from the tank 180 to the scrubbing sprayer assembly 101 via the discharge pipe 214 and the valve 218 (which is opened for the procedure). The valve 216 is closed at this time.

The conduit system 176 receives chrome bearing solution and scrubbing liquor which have drained from the station 82. The illustrated conduit system returns the chrome laden liquids to the plating tank 12 where they are immediately reused. The conduit system 176 might be constructed to deliver the liquids to a suitable storage container. As shown by FIGS. 1 and 2 the system 176 comprises a drain network 230, a trap 232 and a delivery line 234 extending from the trap to the plating tank. The drain network comprises drain lines 240, 242 associated with the first collector station 82 and a manifold pipe 244 communicating the drain lines with the trap. The drain lines are constructed like the lines 200–204 referred to above. The drain line 240 is hermetically joined to the body 92 at the drain port 118 so that the tube structure 105 is loosely received in the drain line. Run-off from the collector assembly 100 passes through the tube structure 105 within the line 240. Chrome bearing liquid trapped in the housing 92 between the housing flanges 110a, 110b drains through the port 118 and the line 240.

The drain line 242 drains the inlet section of the body 92. The drain line 242 is hermetically joined to the body 92 about the port 122 which is located just upstream from the collector assembly 100. Condensate in the diverging inlet section gravitates to the port 122.

Liquid from the lines 240, 242 enters the manifold pipe 244 and passes to the plating tank through the trap 232 and the delivery line 234. The manifold pipe is located below the body 92 like the manifold line 208 and coacts with the trap 232 so that a column of liquid is maintained in the drain lines 240, 242 when the system is operating normally. The trap is located vertically with respect to the body 92 so that the height of the liquid column is sufficient to assure that the end of the tube structure 105 is immersed and discharges below the column surface. At the same time the trap height assures that the liquid column is spaced from the body 92 sufficiently that no liquid from the drain lines 240, 242 enters the housing 80 even though its interior is at a subatmospheric pressure level.

During normal operation of the system 20 the run-off from the station 82 passes, relatively continuously, into the drain network 230 and then into the plating tank via the trap 232. When the station 82 has loaded up with chrome deposits and requires scrubbing, solution from the reservoir is pumped into the station 82 via the wash down spray nozzle 101. This creates a relatively large flow of highly concentrated chrome solution to drain through the network 230 in a relatively short time. This material is handled by the network the same as described in reference to normal system operation with no wash down spray directed onto the collector assembly 100.

The wash down spray assembly is operated for a few minutes during which about one half of the reservoir liquid is pumped out. The float valve mechanism responds to the liquid level change created by removing this much liquid from the tank by opening the fill valve to replenish the reservoir.

While a single preferred embodiment of the invention has been illustrated and described in detail, the invention is not to be considered limited to the precise construction disclosed. Various adaptations, modifications and uses of the invention may occur to those skilled in the art to which the invention relates. It is the intention to cover all such adaptations, modifications and uses coming within the spirit or scope of the appended claims.

Having described my invention I claim:

1. A chrome recovery system into which chrome bearing mist-like fluid, swept from a chrome plating solution surface, is directed comprising:
   a. a chrome removal station comprising structure defining surfaces for collecting chrome from the chrome bearing fluid flowing through the station;
   b. a second chrome removal station downstream from said first removal station, said second station comprising second structure defining surfaces for collecting chrome from fluid flowing through the second station; and,
   c. a chrome reclamation system for reclaiming chrome collected by said surfaces, said reclamation system comprising:
      i. a solvent reservoir;
      ii. solvent recirculating means for directing reservoir solvent onto said second chrome removal station surfaces for removing chrome therefrom and returning the solvent and chrome to said reservoir; and,
      iii. fluid handling means for directing solvent and chrome from said reservoir onto said first chrome removal station surfaces for removing the chrome therefrom and collecting the solvent and chrome from said first removal station.

2. The system claimed in claim 1 wherein said first and second chrome collection stations are supported by a housing and further comprising a fan for inducing a flow of chrome bearing mist into said housing.

3. The system claimed in claim 2 wherein said housing is elevated above the level of said plating solution surface and said fluid handling means comprises a delivery pipe for directing the solvent and chrome into said plating solution.

4. The system claimed in claim 2 wherein said second chrome collecting station comprises a chrome collector assembly and a solvent spraying assembly, said collector assembly comprising a support body and a mesh pad supported by said body for defining said second station surfaces, said solvent spraying assembly disposed upstream from said mesh pad and effective to spray solvent into the effluent from said first removal station and onto said mesh pad.

5. The system claimed in claim 4 wherein said solvent recirculating means comprises a pump for pumping solvent from said reservoir and a pump discharge line for communicating said pump to said solvent spraying assembly.

6. The system claimed in claim 4 wherein said support body is an annular body forming a channel shaped mesh pad retaining periphery into which the chrome material collected on the mesh pad gravitates, and further comprising drain tube structure through which chrome material collected on the mesh pad passes from the support body.

7. The system claimed in claim 1 wherein said solvent recirculating means comprises a solvent pump for pumping solvent from said reservoir to said second chrome removal station via a discharge line, said fluid handling means comprising a valve for communicating said pump to said first chrome removal station to enable solvent and chrome to be directed to said first removal station from said discharge line.

8. A method of recovering chrome from a chrome plating process comprising:
   a. inducing a flow of chrome bearing mist-like fluid from adjacent the surface of a chrome plating solution along a flow path through first and second chrome removal stations;
   b. stationing said first chrome removal station in the flow path with chrome collecting surfaces oriented for contact with the chrome bearing fluid and depositing chrome thereon;
   c. stationing said second chrome removal station in the flow path with second chrome collecting surfaces oriented for collecting chrome from said chrome bearing fluid flowing therethrough and depositing chrome thereon; and,
   d. reclaiming chrome from the first and second chrome removal stations by directing solvent onto said second station surfaces to remove chrome deposited thereon, thereafter directing the solvent and second station chrome onto said first station surfaces to remove chrome deposited thereon, and collecting the solvent and first and second station chrome.

9. The method claimed in claim 8 wherein reclaiming chrome further comprises returning the collected solvent and first and second station chrome to the chrome plating process.

10. The method claimed in claim 8 wherein reclaiming chrome further comprises accumulating solvent and second station chrome from said second station in a reservoir and recirculating said accumulated solvent and second station chrome from the reservoir to the second station surfaces so that the concentration of chrome in said solvent gradually increases.

* * * * *